United States Patent [19]
Kellinger et al.

[11] Patent Number: 5,836,304
[45] Date of Patent: Nov. 17, 1998

[54] COMPUTER SYSTEM FOR COGNITIVE REHABILITATION

[76] Inventors: Frederick J. Kellinger, 109 Priscilla Dr., Sewickley, Pa. 15143; Marvin A. Schilder, 25 Hemlock Dr., Beaver Falls, Pa. 15010

[21] Appl. No.: 700,312

[22] Filed: Aug. 20, 1996

Related U.S. Application Data

[60] Provisional application No. 60/002,592 Aug. 21, 1995.

[51] Int. Cl.⁶ .................................................. A61B 5/00
[52] U.S. Cl. ........................ 128/630; 128/920; 434/118; 623/66
[58] Field of Search .................... 128/630, 920; 434/236, 118, 365; 395/427; 623/66

[56] References Cited

U.S. PATENT DOCUMENTS 5,377,258  12/1994  Bro ............................................ 379/93
5,601,432  2/1997  Bergman ................................. 434/118

*Primary Examiner*—Francis Jaworski
*Attorney, Agent, or Firm*—Carothers & Carothers

[57] ABSTRACT

A computer system for therapeutically assisting in rehabilitation of patients having cognitive deficits. The system includes a base computer data processor, a remotely located therapist computer data processor adapted for remote modem communication with the base processor and a portable programmable data processor that is adapted for mobile use by the patient and is dockable to the base processor. The base, therapist and portable processors are programmed for uploading programming to the portable processor with prescribed patient activity information through the base processor and interface from the remote therapist processor for controlling the operation of the portable processor to communicate the prescribed information to the patient on a scheduled basis. The system is also programmed for downloading patient activity response information form the portable processor to the therapist processor for analysis.

26 Claims, 8 Drawing Sheets

COMPUTER SYSTEM FOR COGNITIVE REHABILITATION

BACKGROUND OF THE INVENTION

This application claims the benefit of U.S. Provisional application No. 60/002,592 filed Aug. 21, 1995.

The present invention pertains to a holistic system which employs computer hardware, software and peripherals, as well as training, monitoring and evaluation in the management and remediation of cognitive deficits found in persons who have suffered brain injury or deterioration as a result of trauma or disease.

Persons with cognitive disorders resulting from birth defect or injury to the brain have symptoms which include lack of orientation to time and place and the inability to recall, organize and process information. These injuries may be caused by trauma, disease or deterioration and include aging, alcoholism, drug dependency, stroke, Alzheimer's disease and severe head wounds. Patients with such cognitive disorders require considerable assistance in managing their daily activities. A widely used source of assistance is a personal caregiver—usually a close family member. Further assistance may be provided by prosthetic memory devices such as notebooks, daily organizers, personal pagers and/or computers. These devices or systems provide memory assistance in many areas of daily life management. Examples of such supported daily functions are time orientation and management with appointment reminders and deadline cues, specific task guidance and coaching, journaling of daily events, telephone contacts, help information, maintenance of directories, planning and cuing of daily chores and responsibilities, money management, support of self care and grooming, performance of specific vocational tasks and tracking school assignments and homework.

Computer systems, along with logic puzzles, word games, etc. may also be used as ortheses to facilitate cognitive remediation. Such systems support the organization, planning and management of assignments which are fundamental to the everyday existence of the patient and they additionally provide the patient with the encouragement and confidence required to reenter the greater community.

The goal of cognitive rehabilitation is to enhance the ability of the patient to adapt at home, in the community and at work or school, and to increase the patient's function and independence. An Additional goal of cognitive rehabilitation is to systematically increase the patient's functionality through redundancy. Experience has shown that computers can be effective tools in the management and remediation of cognitive deficits when they are integrated in a comprehensive system of cognitive care and continued usage of the present invention is expected to strengthen short term memory thorough repetition and to assure that cognitive gains are not lost through memory seepage.

There are a number of computer systems presently available on the market which are frequently employed in the management of cognitive deficits. Typically such present day systems include ordinary notebook and desk top computers which are usually coupled with word processing software and organizing software.

Other such systems are much simpler in function and generally consist of nothing more than a memory jogging device or cuing device, or a paging device. These devices employ traditional day timers or daily organizers found in portable computer form for normal office use.

One of the more recognized computer orthotic systems presently found on the market is sold under the trademark NeuroPage. Another such system is sold under the trademark MNEMOSYNE. The former is a prosthetic alpha numeric paging system which provide reminders to individuals with memory deficits throughout the day. The latter utilizes conventional Macintosh or IBM compatible (PC) desk top computers or a notebook computer for patient use.

These devices clearly promote independence for people with cognitive deficits and also free up the time of professional staff or therapists. However, they do exhibit some shortcomings which the computer orthotic and prosthetic system of the present invention overcomes.

The computer orthotic systems of the prior art do not permit communication with the patient in all possible modalities (tactile, visual and audio), do not permit remote programming by the therapist of a truly portable device that is readily carried by the patient, do not permit assignment of priority and difficulty levels to tasks to be performed by the patient, and do not permit remote downloading of patient input data to the therapist for analysis, and do not in and of themselves actually assist in such analysis, nor have a capability of compiling or printing progress and diagnostic reports. The systems of the prior art provide no means for soliciting, recording and storing patient responses to each message, which can be later remotely downloaded and analyzed so as to monitor and adjust the system to the patient's changing needs and support continued movement toward increased independence and capability.

The inventors discovered these deficiencies and concluded that a system which overcame these shortcomings would be much more beneficial in accelerating the patient's rehabilitation, while, at the same time, providing the patient with much more independence and confidence than therefore possible to attain through the use of computer orthotic systems or memory jogging devices presently on the market.

SUMMARY OF THE INVENTION

The patient management system of the present invention includes computer data processing systems with peripherals, and software for these systems. The software allows for programming, training, monitoring and evaluation. This holistic system therapeutically assists the rehabilitation process for a patient requiring cognitive intervention by providing a truly portable, programmable data processor adapted for use by persons with cognitive deficits.

The prescribed plan for a particular patient is entered into the therapist's computer which is typically a general purpose processor linked to the patient's base computer through conventional modem. The patient's base computer interfaces (communicates) with its attached docking station to download the prescribed patient activity information (including specific task instruction when needed) into the patient's hand held device (portable processor). The docking interface not only allows the patient or caregiver to download the patient's daily schedule from the therapist's computer, but also allows the patient or caregiver to make certain additions or changes to the daily schedule as situationally required (i.e. time change in a scheduled appointment.

This stored prescription activity information is communicated (usually unsolicited) on a scheduled basis to the patient by the portable processor for patient response. Priority levels and difficulty levels are assignable to specific tasks to be carried out by the patient for later therapist reference and evaluation. The patient is solicited to respond to the scheduled activity information. This patient response information is recorded and stored in the portable processor as input by the patient in response to the communicated activity information. The stored patient response information is periodically uploaded from the portable processor through the base computer/docking station via modem to the therapist's computer for monitoring and analysis. This analysis can aid the therapist in monitoring a patient's progress and determining the efficacy of the prescribed patient program.

Generally the portable processor is programmed from the therapist computer through a modem, a base computer data processor located at the patient's home and a docking interface for communication between the portable processor and the base processor.

The therapist processor is also preferably programmed for analyzing this patient response information and for providing progress reports. The analysis can assist the therapist in determining the effectiveness of prescribed medication on the patient.

The docking station interfaces with the patient's base computer which allows the patient or caregiver to download his or her daily schedule from the therapist's computer to the portable processor and to upload a record of his daily activities and responses to the therapist's computer on a periodically scheduled basis. Further, the docking station will allow for checking the status of the portable processor's batteries and recharging them as necessary.

The therapist's computer maintains a database of the patient's activities and responses to portable processor transmissions, and checks status of the batteries in the hand held device (both of which have been uploaded through the base computer/docking station). The therapist's computer also downloads any changes to the patient's daily schedule and generates forms and reports required for the patient's case management.

Accordingly, this holistic, computer based, orthotic and prosthetic system of cognitive remediation is sensitive to the requirements of the individual patient, greatly reduces therapy time, and therefore cost, frees up the therapist, the institution and the caregiver from much of the intensive personal therapy time, as well as provides the patient with increased independence and self esteem.

The patient portable processor generally includes an operative interconnected combination of a microcontroller, data storage memory, a signal alarm, a message transmitter, a patient response input, a power source, and an interface adapted for communication connection to the base processor.

The power source will generally consist of a rechargeable battery that is adapted for recharging through the interface with the base unit.

The signal alarm may be an alarm of any selected modality, such as a tactile, visual or audio alarm and may be of any required intensity and repetitive application. Similarly, the message transmitter which transmits the messages from the portable processor to the patient may signal in one or more modality, such as a tactile, visual and/or an audio transmitter.

BRIEF DESCRIPTION OF THE DRAWINGS

Other objects and advantages appear hereinafter in the following description and claims. The accompanying drawings show, for the purpose of exemplification, without limiting the invention or claims thereto, certain practical embodiments of the invention wherein:

DETAILED DESCRIPTION OF A PREFERRED EMBODIMENT

Figure 1:
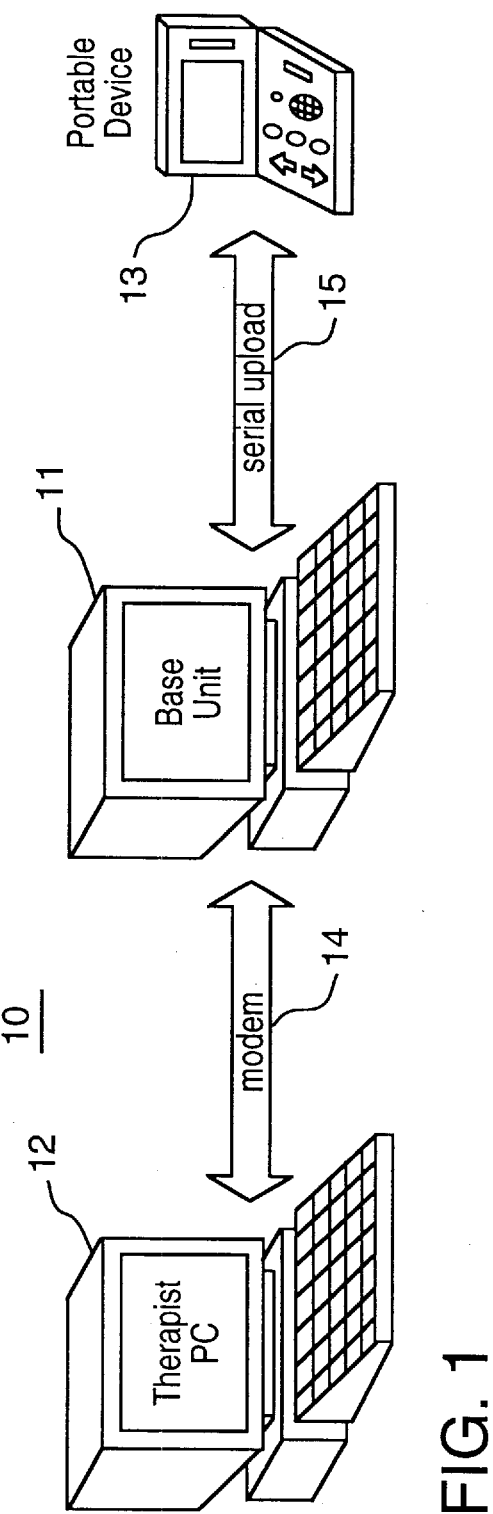
FIG. 1 is a schematic block drawing providing a diagrammatic overview of the computer orthotic and prosthetic system of the present invention.

Referring to FIG. 1, a diagrammatic overview of the computer system 10 of the present invention for therapeutically assisting in rehabilitation of a patient having cognitive deficits is illustrated. The system 10 consists of three basic components; namely, the base unit or computer data processor 11, the therapist computer data processor 12 and the portable programmable data processor or device 13.

The base unit 11 and the therapist processor 12 are general purpose processors, such as commercial PC computers with FAX modems. The therapist's processor 12 is remotely located for convenient access by the therapist and the base unit or processor 11 is usually located at the home or office of the patient to be treated and is operated by the patient or a caregiver.

Figure 2:
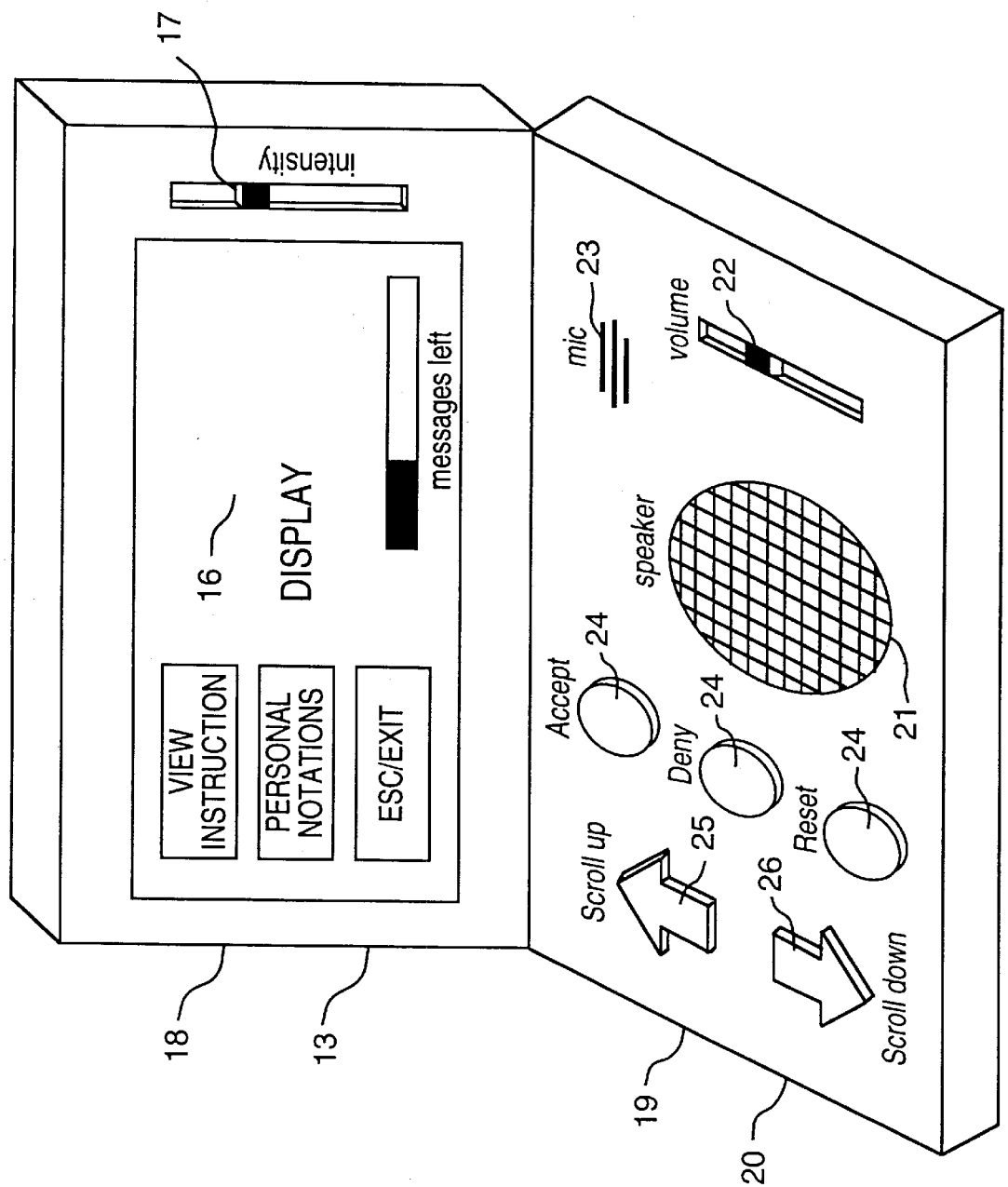
FIG. 2 is an enlarged view of the patient portable processor portion of the system shown in FIG. 1.

The portable programmable data processor 13 is custom manufactured and adapted for mobil use by the patient. Detail of the portable programmable data processor 13 is illustrated in FIG. 2.

The therapist communicates with the patient devices (base unit PC 11 and portable processor or device 13) through the FAX modem connection 14.

The function of the base unit or processor 11 is to provide a communication link between the therapist and the portable device 13, and to program the portable device 13. The base unit 11 further includes a communication/battery charger link to the portable device 13.

The portable device or processor 13 is a hand held device (could be as small as a cellular telephone) that the patient can readily carry. The device is powered by internal rechargeable batteries and the portable device 13 is connected to the base unit (hereinafter referred to as docking) through a serial upload or interface 15 at the patient's or caregivers convenience for the exchange of information and battery charging.

With particular reference to FIG. 2, the portable device or processor 13 has a visual text (LED or LCD) display 16 and a brightness control 17, provided in the upper half 18 of the closeable hinged case 19.

The lower portion 20 of case 19 is provided with a speaker 21 with volume control 22 and a microphone 23 for recording personal notes.

Keys 24 are provided for the patient to respond to the continuously activatable vibratory, audio and visual prompts. Scroll up and scroll down keys 25 and 26 are provided so that the patient can scroll up and scroll down through the prescribed patient activities programmed into the device 13 so that he or she can preview the prescribed day or week activities on display 16. The patient can also use the same scroll keys 25 and 26 to sequence through instruction steps.

As opposed to prior art devices previously mentioned, the number of keys are limited so that cognitively challenged persons can cope with the frustration and stress experienced in working with the portable device 13. Also shape and color of the keys may be specified by the therapist.

The portable processor or unit 13 is also provided with alarms (tactile, visual and audio) and a communication port (not shown in FIG. 2). These devices and the basic hardware components of the portable processor unit 13 are illustrated in block diagram form in FIG. 3.

The portable processor 13 includes an operative interconnected combination of a microcontroller 30, which includes data storage memory, signal alarms (tactile, visual and audio) 31, and interface 15 in the form of a serial interface for communication connection to the base processor 11, when the portable unit is docked. 5 The portable unit 13 further includes a digital speech processor 32, a serial flash eeprom 33, a CODEC 34, amplifiers 35 and 36 for respectively driving speaker 21 and amplifying signals input through microphone 23.

Microcontroller 30 communicates to the base unit 11 through the serial interface 15 when docked. The microcontroller will download information from base unit 11 through the digital speech processor 32 and into serial flash eeprom 33. Microcontroller 30 is capable of uploading information from the serial flash eeprom 33 through the digital speech processor 32 and into the base unit 11 through serial interface 15.

Microcontroller 30 is programmed to monitor the time and alert the user through the alarms 31 (either as a tactile, visual or audio alarm as selected by the therapist) when a message is to be displayed on display 16. Microcontroller 30 will display the message visually on the display 16 and also audibly through the speaker 21. Microcontroller 30 is also programmed to manage the recording of personal notes via speech through microphone 23 input by the patient or caregiver.

The alarms consist of an audio signal which is communicated through speaker 21, a visual signal through a flashing LED (not shown), and a tactile signal through a vibrator (not shown). These alarms are all diagrammatically displayed as element 31 in the block diagram of FIG. 3.

Digital speech processor 32, under control of the microcontroller 30, will process information from the microcontroller or the microphone for storage in the serial flash eeprom 33. The digital speech processor 32, under control of microprocessor 30, processes information from serial flash eeprom 33 to either the microcontroller 30 or the speaker 21. Serial flash eeprom 33 functions as a storage device for both audio and text information. Serial flash eeprom 33 accordingly functions as additional data storage memory for portable processor 13.

CODEC 34 functions as an interface providing analog to digital and digital to analog conversions for the digital speech processor 32 and for amplifiers 35 and 36 connected respectively to speaker 21 and microphone 23. Amplifiers 35 and 36 for the speaker and microphone provide proper signal levels and volume control.

Speaker 21, alarms 31 and display 16 function as message transmitters. User keys 24 function as a patient response input. Microphone 23 may also function as a patient response input.

Figure 3:
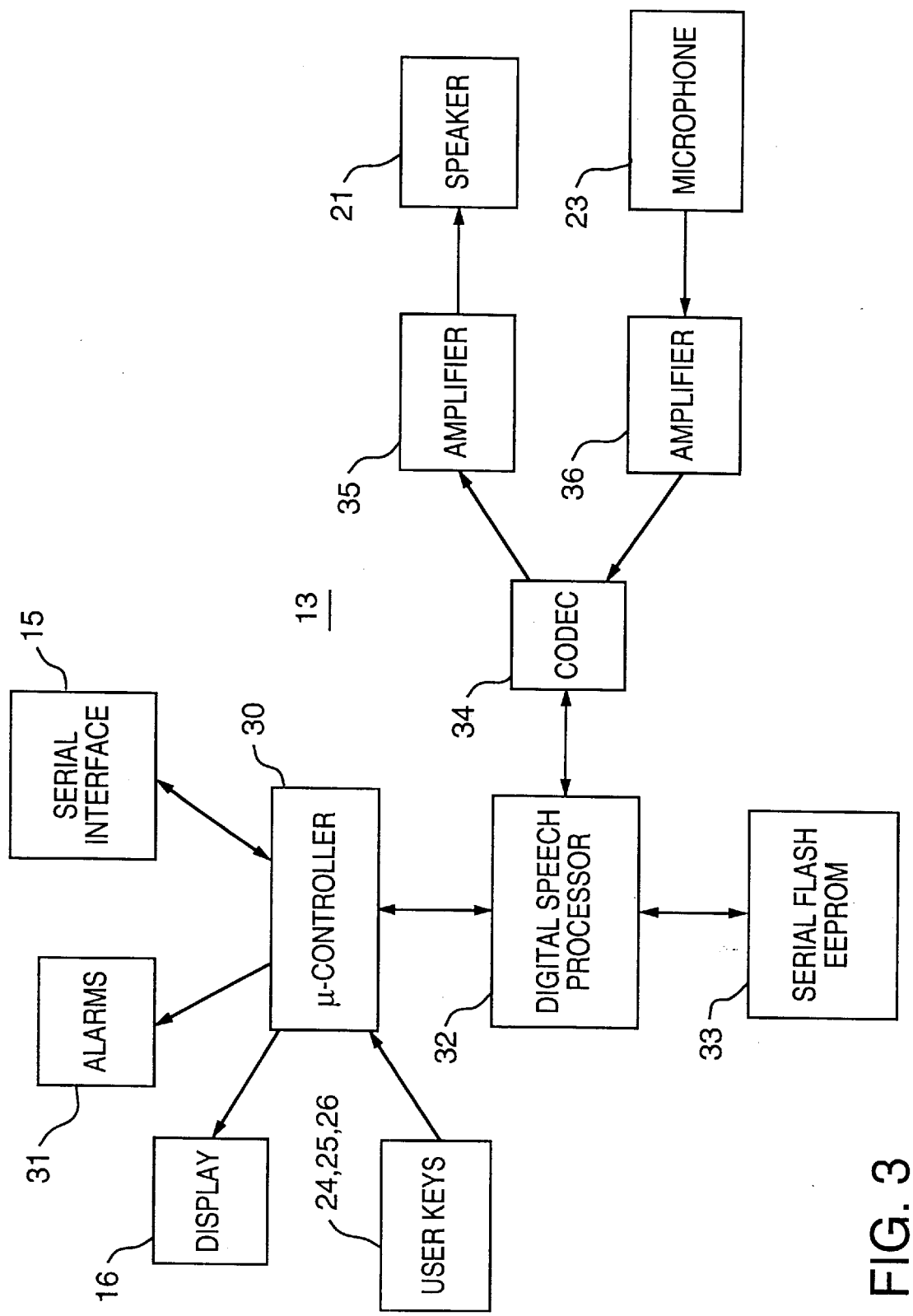
FIG. 3 is a hardware schematic block diagram of the patient portable processor shown in FIG. 2.

The rechargeable battery unit which powers portable processor or unit 13 is not illustrated in FIG. 3.

Portable processor 13 is programmed for recording and storing patient response information entered through the patient response input, such as input keys 24. The base unit 11, therapist PC 12 and portable processor 13 are programmed for upload programming of the portable processor 13 with prescribed patient activity information through base processor 11 and the interface 15 from the remotely located therapist PC or processor 12 for controlling the operation of the portable processor 13 to communicate the prescribed information to the patient on a scheduled basis. All of these processors are also programmed for downloading patient activity response information from the portable processor 13 through interface 15 and base processor or unit 11 to remote therapist processor or PC 12 for analysis. An overview of the system software is provided in the software flow chart of FIG. 4.

Figure 4:
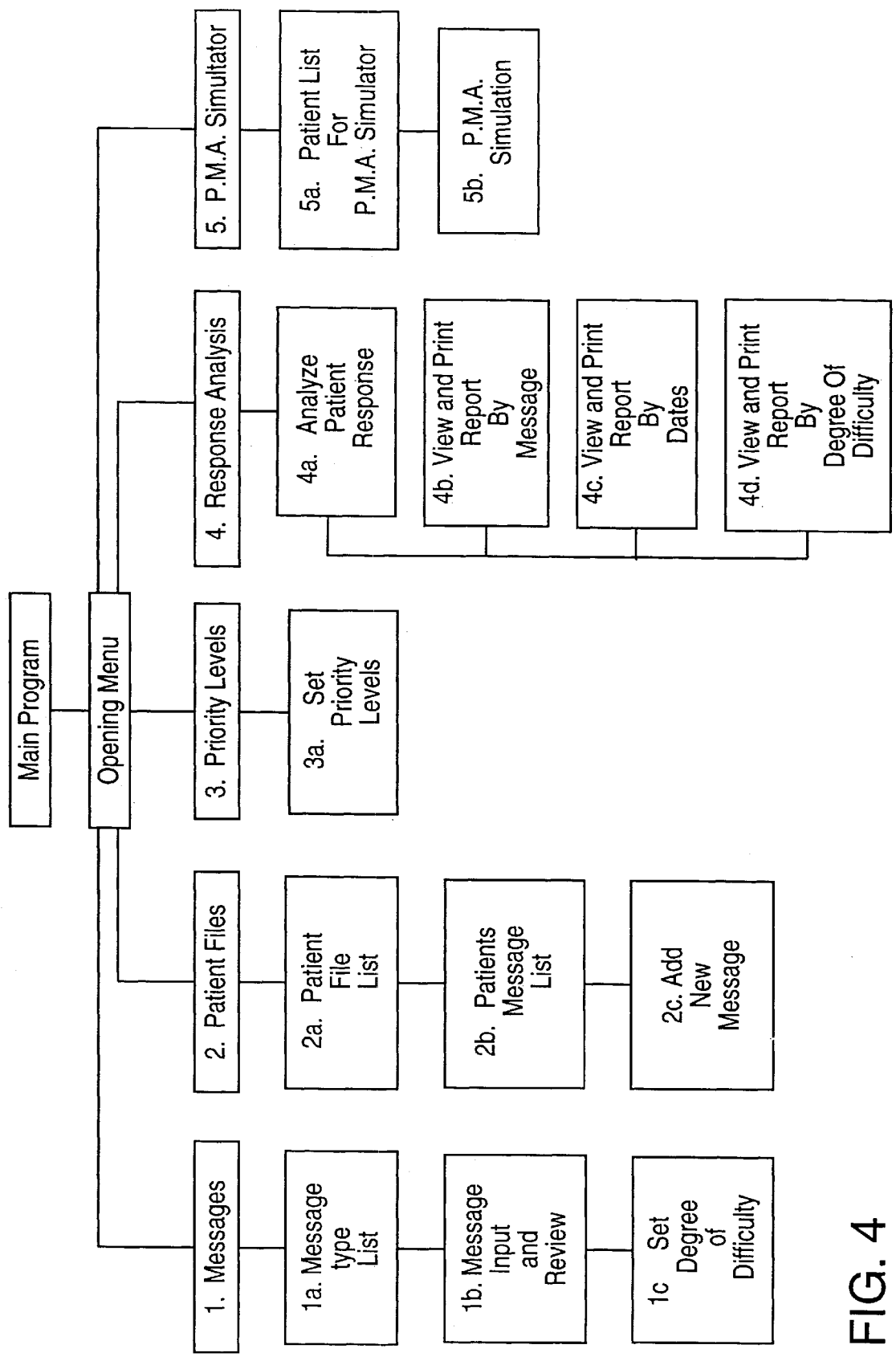
FIG. 4 is a software flow chart overview for the computer system of FIG. 1.

Software options and screens are described as numbered in FIG. 4.

Messages menu option screen 1 brings up the Message Type List screen 1a which brings up current messages by their categories, e.g., Medical, Personal, Work, Social, Domestic, and All.

Message Input and Review screen 1b reviews, edits messages and sets signal variations. Set Degree of Difficulty screen 1c, enables the therapist to analyze patient responses based on task difficulty levels preset by the therapist.

Patient Files menu option 2, brings up Patient File List screen 2a and lists patients to be selected by name. Patients Message List screen 2b, lists selected patients current messages. Add New Message screen 2c, permits addition of new messages as well as signal time, day or date.

Priority level menu option 3 brings up the Set Priority Level screen 3a, which enables the therapist to assign a priority level to prescribed activity messages based on importance. Priority levels assign the number of signals and intervals of signals communicated to or subjected to the patient.

Response Analysis menu option 4, brings up the Response Analysis screen 4a and permits an analysis of the patient or patients based upon the following screens and their options.

View and Print Report By Message screen 4b permits patient analysis based upon selected messages for success rate or progress to be viewed or printed on a report. View and Print Report by Dates screen 4c permits patient analysis based upon selected date for success rate or progress to be viewed or printed on a report. View and Print Report by Degree of Difficulty screen 4d permits patient analysis based upon degrees of difficulty for success rate or progress to be viewed or printed on a report.

PMA is an intended trademark of the inventor's for the portable processor unit 13 and PMA Simulator menu option 5 brings up the Patient List for Simulation screen 5a and permits selection of patient by name for PMA or portable unit simulation. PMA Simulation screen 5b displays an actual simulation of the portable unit device itself and the messages as they would be displayed.

Figure 5:
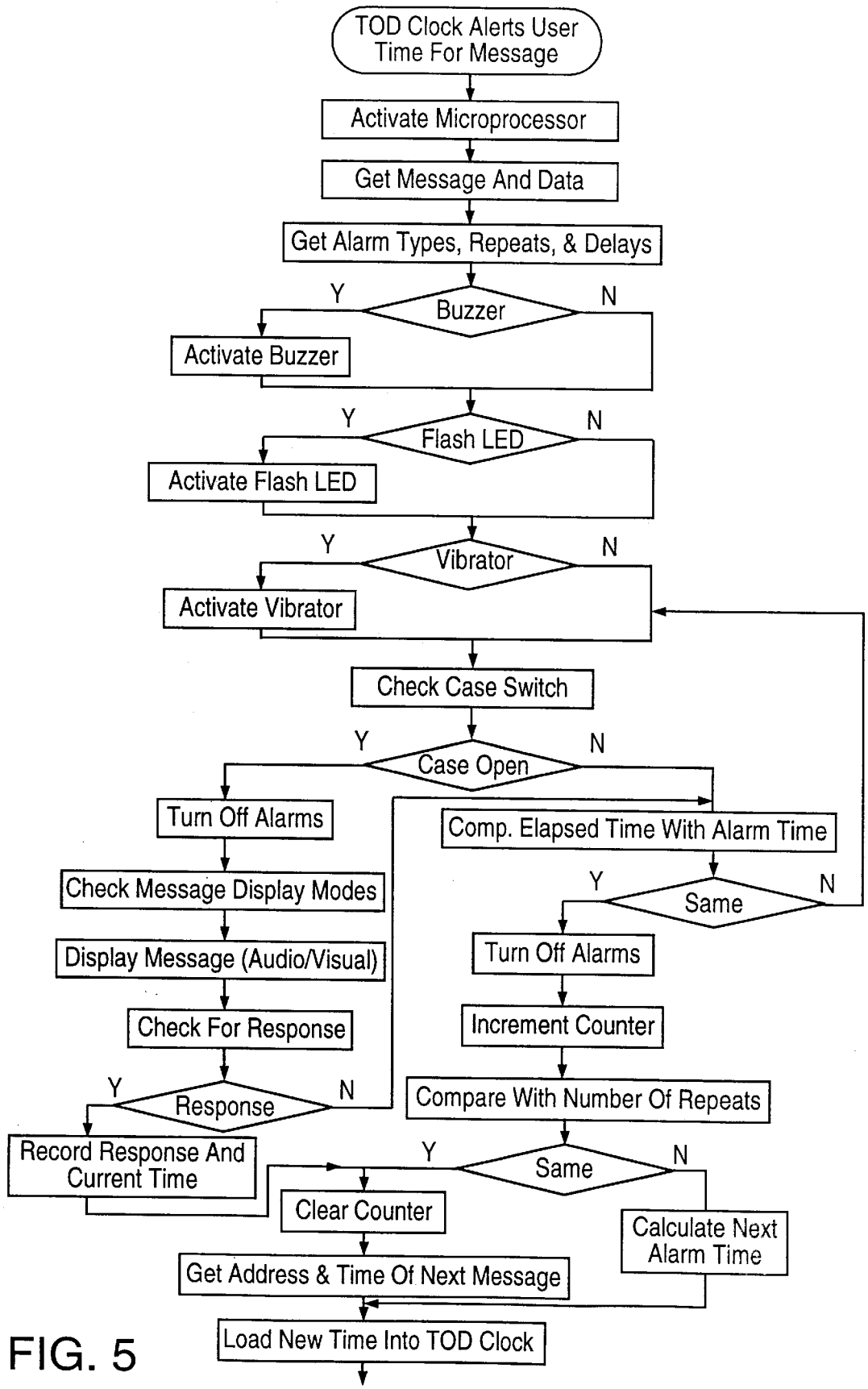
FIG. 5 is a detailed software flow chart for the alarm signal portion of the patient portable processor unit of FIG. 2.
Figure 6A:
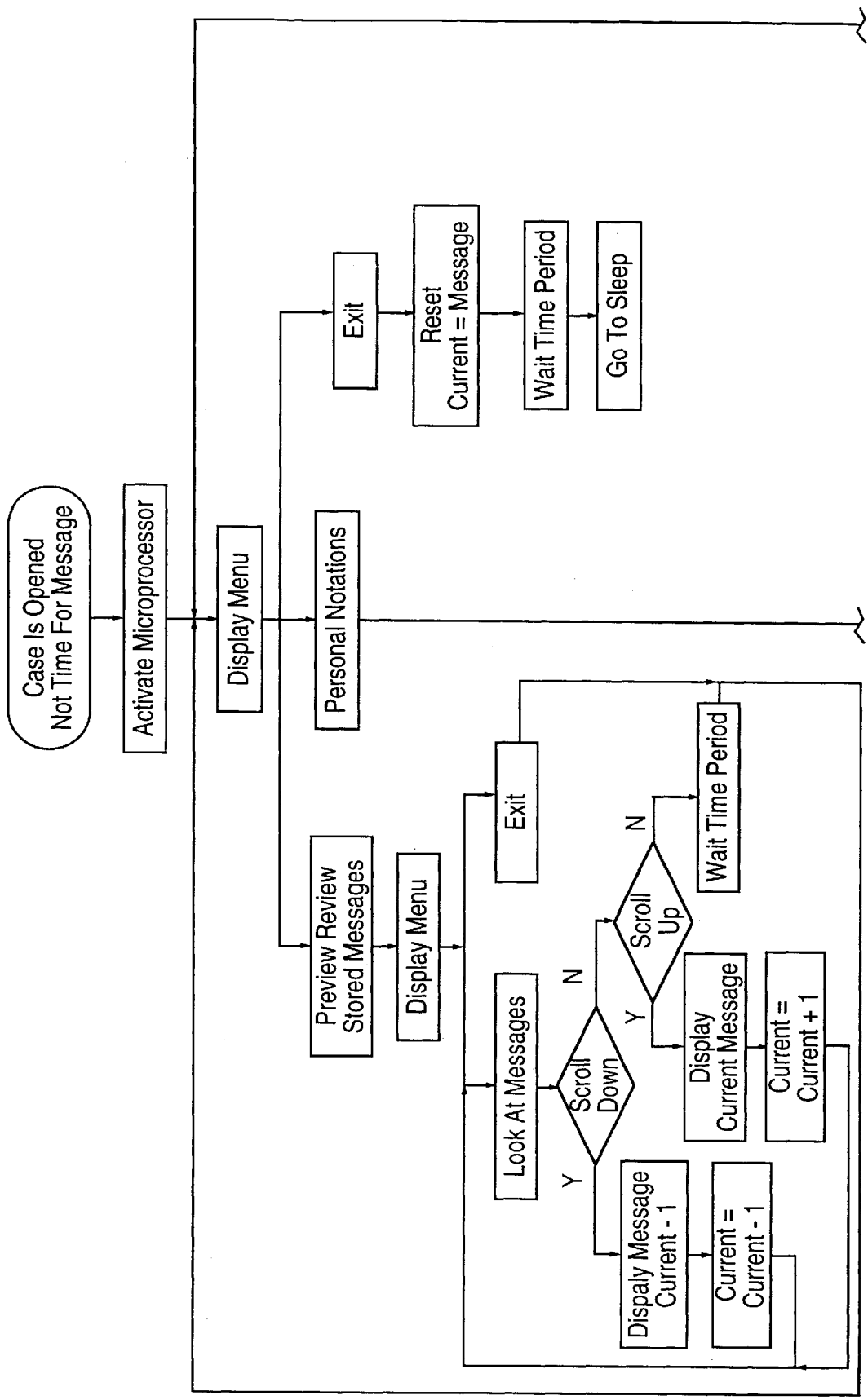
FIG. 6a, FIG. 6b and 6c show in combination a detailed software flow chart for the patient instruction and response functions of the patient portable processor unit of FIG. 2.
Figure 6B:
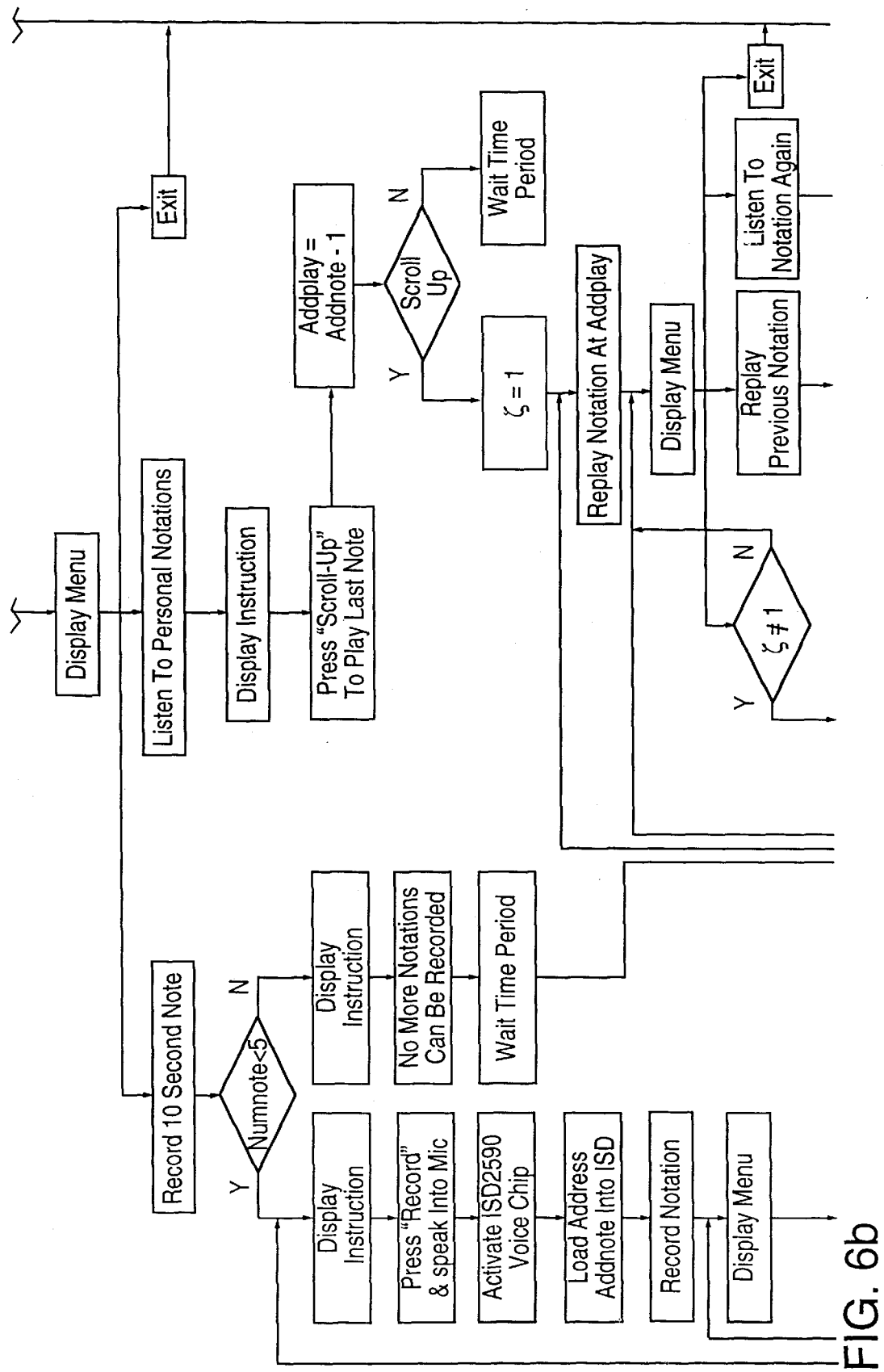
Figure 6C:
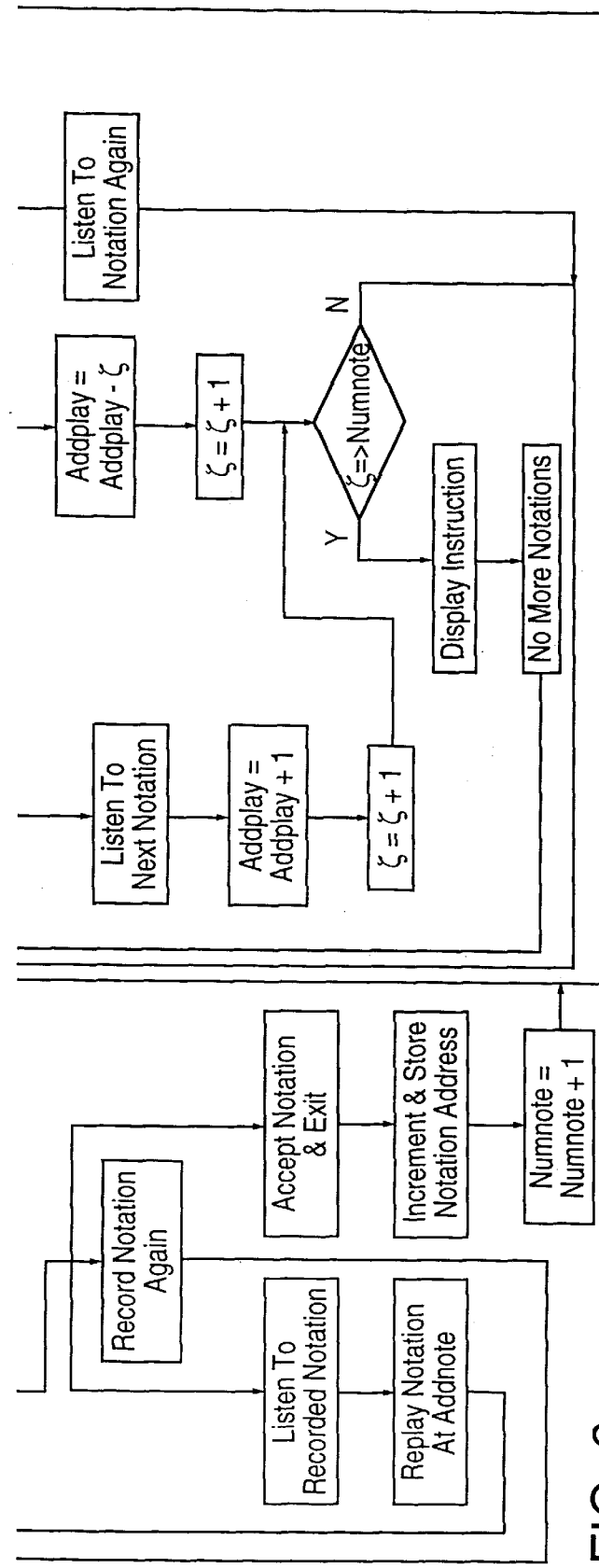

FIG. 5 is a detailed software flow chart illustrating the required programming for the alarm signal portion of the patient portable processor unit 13. In other words, this flow chart shows one of two modes for the portable unit operation. This is the first mode of operation when the microcontroller 30 in the portable unit 13 alerts the user or patient that it is time to respond to a message. The second mode of operation is when the user desires to review/preview messages or record a personal note. This second mode is illustrated for programming in the detailed software flow chart of FIGS. 6a, 6b and 6c.

The software flow charts of FIGS. 5 and 6 are selfexplanatory to those of ordinary skill in the art of computer programming. It will be readily understood that a computer programmer of ordinary skill, upon viewing the software flow charts of FIG. 4, 5 and 6 will be readily capable of writing the necessary program to carry out the functions displayed and required in order to operate the computer system of the present invention as described and claimed.

The computer system 10 of the present invention is thus programmed so that the portable computer data processor 13 can be programmed remotely from the therapist computer data processor 12 for storing prescribed patient activity information for a patient. Portable processor 13 is further programmed to communicate the stored activity information on a scheduled basis to the patient for solicited patient response and further programmed to record and store patient response information input by a patient on the keys 24 in response to the communicated activity information.

The system is also programmed for permitting the portable processor to be downloaded to the remote therapist computer data processor 12 for retrieving the stored patient response information for analysis.

The therapist PC or processor 12 is programmed to analyze the patient response information and to provide analysis reports. The therapist's PC 12 is further programmed to assign priority and difficulty levels to prescribed tasks of the patient activity information as input by the therapist to assist the analysis process.

We claim:

1. A portable programmable data processor for mobile use by a cognitive deficient patent for administering rehabilitation therapy, said portable processor comprising:

means for programming said portable processor from a therapist computer data processor for storing prescribed patient activity information for a patient;

means for communicating the stored activity information on a scheduled basis to a patient for patent response;

means for recording and storing patient response information input by a patient in response to the communicated activity information; and means for downloading said stored response information from said portable processor to a therapist computer data processor for analysis;

said means for communicating including a continuously activatable signal alarm capable of providing at least one patient alarm selected from the group consisting of tactile, visual and audio alarms.

2. The portable programmable data processor of claim 1, wherein said means for programming includes a base computer data processor and a therapist computer data processor adapted for remote modem communication with said base processor, and an interface adapted for communication connection between said portable processor and said base processor.

3. The portable programmable data processor of claim 1, wherein said means for communicating further includes at least one message transmitter selected from the group consisting of tactile, visual and audio transmitters.

4. The portable programmable data processor of claim 3, wherein said means for recording and storing includes a microcontroller, data storage memory and a patient response input.

5. The portable programmable data processor of claim 4, wherein said patient response input includes at least one input device selected from the group consisting of tactile, visual and audio input devices.

6. The portable programmable data processor of claim 5, wherein said means for downloading includes said microcontroller, data storage memory, interface, base processor and therapist processor.

7. The portable programmable data processor of claim 6, including a rechargeable battery power source and a battery recharger connectable to said battery for recharging through said interface.

8. The portable programmable data processor of claim 1, wherein said therapist processor is programmed for analyzing said patient response information.

9. The portable programmable data processor of claim 8, wherein said therapist processor is programmed for permitting assignment of priority levels and difficulty levels to prescribed tasks of said patient activity information as prescribed and input by a therapist.

10. The portable programmable data processor of claim 1, wherein said prescribed patient activity information includes instructions for performing prescribed tasks.

11. A computer system for therapeutically assisting in rehabilitation of patients having cognitive deficits, the system comprising:

a base computer data processor;

a therapist computer data processor adapted for remote modem communication with said base processor; and a portable programmable data processor for mobile use by a cognitive deficient patient;

said portable processor including an operative interconnected combination of a microcontroller, data storage memory, a signal alarm, a message transmitter, a patient response input, a power source, and an interface adapted for communication connection to said base processor;

said portable processor programmed for recording and storing patient response information entered through said patient response input;

said base, therapist and portable processors programmed for upload programming of said portable processor with prescribed patient activity information through said base processor and said interface from said remote therapist processor for controlling the operation of said portable processor to communicate the prescribed information to the patient on a scheduled basis, and programmed for downloading patient activity response information from said portable processor through said interface and said base processor to said remote therapist processor for analysis;

said signal alarm including at least one continuously activatable alarm selected from the group consisting of tactile, visual and audio alarms.

12. The computer system of claim 10, wherein said power source includes a rechargeable battery which is adapted for recharging through said interface.

13. The computer system of claim 12, wherein said therapist processor is programmed for analyzing said patient response information.

14. The computer system of claim 13, wherein said message transmitter is at least one transmitter selected from the group consisting of tactile, visual and audio transmitters.

15. The computer system of claim 10, wherein said prescribed patient activity information includes instructions for performing prescribed tasks.

16. A method of therapeutically assisting the rehabilitation of a patient having cognitive deficits with a computer system, the method comprising the steps of:

providing a portable programmable data processor for mobile use by a cognitive deficient patient;

programming said portable processor from a therapist computer data processor for storing prescribed patient activity information for the patient;

communicating the stored activity information on a scheduled basis to the patient with said portable processor for patient response;

recording and storing patient response information in said portable processor which is input by the patient in response to the communicated activity information; and downloading said stored response information from said portable processor to a therapist processor for analysis;

the step of communicating including the step of transmitting a continuously activatable alarm with at least one transmitter selected from the group consisting of tactile, visual and audio transmitters.

17. The method of claim 16, wherein the step of programming is carried out through a modem, a base computer data processor and a docking interface for communication between said portable processor and said base processor.

18. The method of claim 16, including the step of analyzing said patient response information with said therapist processor.

19. The method of claim 16, including the step of assigning priority levels and difficulty levels to prescribed tasks of said patient activity information.

20. The method of claim 16, wherein the step of programming said portable processor includes the step of storing instructions for performing prescribed tasks.

21. The method of claim 16, wherein the step of recording and storing includes the step of imputing patient response information with at least one input device selected from the group consisting of tactile, visual and audio input devices.

22. A storage medium encoded with machine-readable computer program code used in a computer system for administering rehabilitation therapy to a cognitive deficient patient, comprising:

means for causing a portable computer data processor to be programmed from a therapist computer data processor for storing prescribed patient activity information for a patient;

means for causing said portable processor to communicate the stored activity information on a scheduled basis to a patient for solicited patient response;

means for causing said portable processor to record and store patient response information input by a patient in response to communicated activity information; and means for permitting said portable processor to be downloaded to a therapist computer data processor for retrieving said stored patient response information for analysis;

said means for causing said portable processor to communicate including means for causing a continuously activatable unsolicited alarm signal to be communicated to a patient.

23. The storage medium of claim 22, including means for causing said therapist processor to analyze said stored patient response information for a therapist.

24. The storage medium of claim 22, wherein said means for permitting said portable processor to be downloaded includes means for causing a modem to transmit said stored patient response information to said therapist processor at a remote location.

25. The storage medium of claim 22, including means for causing said therapist processor to assign priority and difficulty levels to prescribed tasks of said patient activity information as input by a therapist.

26. The storage medium of claim 22, wherein said means for causing a portable computer data processor to be programmed includes means for causing said portable data processor to be programmed with instructions for performing prescribed tasks.

* * * * *